United States Patent
Greenawalt

(10) Patent No.: US 9,586,295 B2
(45) Date of Patent: Mar. 7, 2017

(54) WELDING FIXTURE APPARATUS

(71) Applicant: Keith Allan Greenawalt, North Benton, OH (US)

(72) Inventor: Keith Allan Greenawalt, North Benton, OH (US)

(*) Notice: Subject to any disclaimer, the term of this patent is extended or adjusted under 35 U.S.C. 154(b) by 113 days.

(21) Appl. No.: 14/631,150

(22) Filed: Feb. 25, 2015

(65) Prior Publication Data
US 2016/0243658 A1 Aug. 25, 2016

(51) Int. Cl.
*B23K 37/04* (2006.01)
*B23K 37/053* (2006.01)

(52) U.S. Cl.
CPC ...... *B23K 37/0452* (2013.01); *B23K 37/0531* (2013.01)

(58) Field of Classification Search
None
See application file for complete search history.

(56) References Cited

U.S. PATENT DOCUMENTS

| | | |
|---|---|---|
| 2,187,878 A | 1/1940 | Hill et al. |
| 2,452,985 A | 11/1948 | Bourdette |
| 2,767,677 A | 10/1956 | Johnson et al. |
| 2,803,208 A * | 8/1957 | Bernard .............. B23K 37/0435 269/228 |
| 2,854,941 A | 10/1958 | Vollmer |
| 3,030,903 A | 4/1962 | Morris |
| 3,128,735 A * | 4/1964 | Mayers .............. B23K 37/0443 269/45 |
| 3,905,572 A * | 9/1975 | Hikai ................. B63C 5/02 248/242 |
| 4,541,621 A * | 9/1985 | Amos ................ B23K 37/0536 269/43 |
| 2011/0024394 A1 * | 2/2011 | Esslinger ........... B23K 37/0276 219/76.1 |

OTHER PUBLICATIONS

Proline Global—Portable Chuck Spinner—PCS, webpage published Oct. 24, 2013, see wayback machine copy.*
Javeline Industrial—Youtube video—https://youtu.be/IMBwqeEcizs, published Jan. 16, 2015.*
Proline Global webiste; "Portable Chuck Spinners" webpage; published Oct. 24, 2013.

* cited by examiner

*Primary Examiner* — Devang R Patel
(74) *Attorney, Agent, or Firm* — Black, McCuskey, Souers & Arbaugh, LPA

(57) ABSTRACT

A welding fixture apparatus has a base and an adjustable head configured for adjustable engagement with one or more workpieces and methods of use.

22 Claims, 8 Drawing Sheets

WELDING FIXTURE APPARATUS

RELATED APPLICATIONS

There are no applications related to this application.

FIELD OF THE DISCLOSURE

The present disclosure and related inventions are in the general fields of fixtures and in particular fixtures for purposes of welding or welded fabrication including pipe, flanges and fittings.

BACKGROUND

Flanges, fittings and pipe are required in many areas, including commercial and residential buildings, gas and oil, heating and cooling facilities, refineries, and many more. In assemblies requiring multiple flanges, fittings and pipe each piece must be held in place, many times at different angles, and aligned and fixedly held precisely in relative arrangements before applying a metal weld or plastic adhesive. To effectively hold the pieces of an assembly in place and ensure proper level prior to applying a metal weld or plastic adhesive, pipe fitters and welders must resort to a time-consuming method of fabricating a mechanism on their own using a variety of tools at their immediate disposal. Such tools include clamping devices, screw drivers, wedges, shims of various material (iron plate, rocks, wood, etc.), and leveling devices. Operators working on location fabricate a make-shift mechanism from the back of their work vehicle and carry the finished piece to a separate location.

Currently there is not a portable adjustable apparatus available that will hold and level multiple pieces such as flanges, fittings and pipe in place, or that adjusts to any position. Operators must fabricate an apparatus using whatever tools available that will hold the pieces in place, at different angles, and aligned properly before applying a metal or plastic adhesive. The process to fabricate an apparatus and set a flange, fitting and pipe is time-consuming and oftentimes requires more than one person to complete.

SUMMARY OF THE DISCLOSURE

A portable welding fixture apparatus for holding and adjusting to different angles multiple pieces such as flanges, fittings and pipe in place for the purpose of applying a metal weld or plastic adhesive to join the pieces together. The apparatus operates functions to hold, support, and level multiple flanges, fittings and pipe. The apparatus can be utilized in any of its various configurations and orientations, and in any environment or setting including on construction and installation sites and field work and any type of welding such as MiG, TiG and materials including steel, aluminum and alloys.

In a preferred embodiment the apparatus has two principal components: a head which provides the means to hold and level multiple pieces for pipe welding, and a foldable support base to elevate and hold the head in a work position.

In one embodiment, the head includes a lathe chuck mounted to a steel or stainless steel plate assembly that controls the spin of the chuck and allows for tightening and locking the chuck into place. The plate assembly is connected to a tilting point which will enable the operator to adjust pieces to different vertical angles and lock them in place for a secure hold. The chuck and tilt assembly is attached to a main shaft. A turnbuckle attached to the top point of the plate assembly and to the main shaft allows for adjusting the tilting angle. The head fits into a foldable support base composed of a shaft with three main legs and three bracing arms. In a preferred embodiment, some or all of the various components of the welding fixture apparatus are made of stainless steel.

DESCRIPTION OF THE FIGURES

The present invention may be better understood from the following photographs which are explained as.

DETAILED DESCRIPTION

Figure 1:
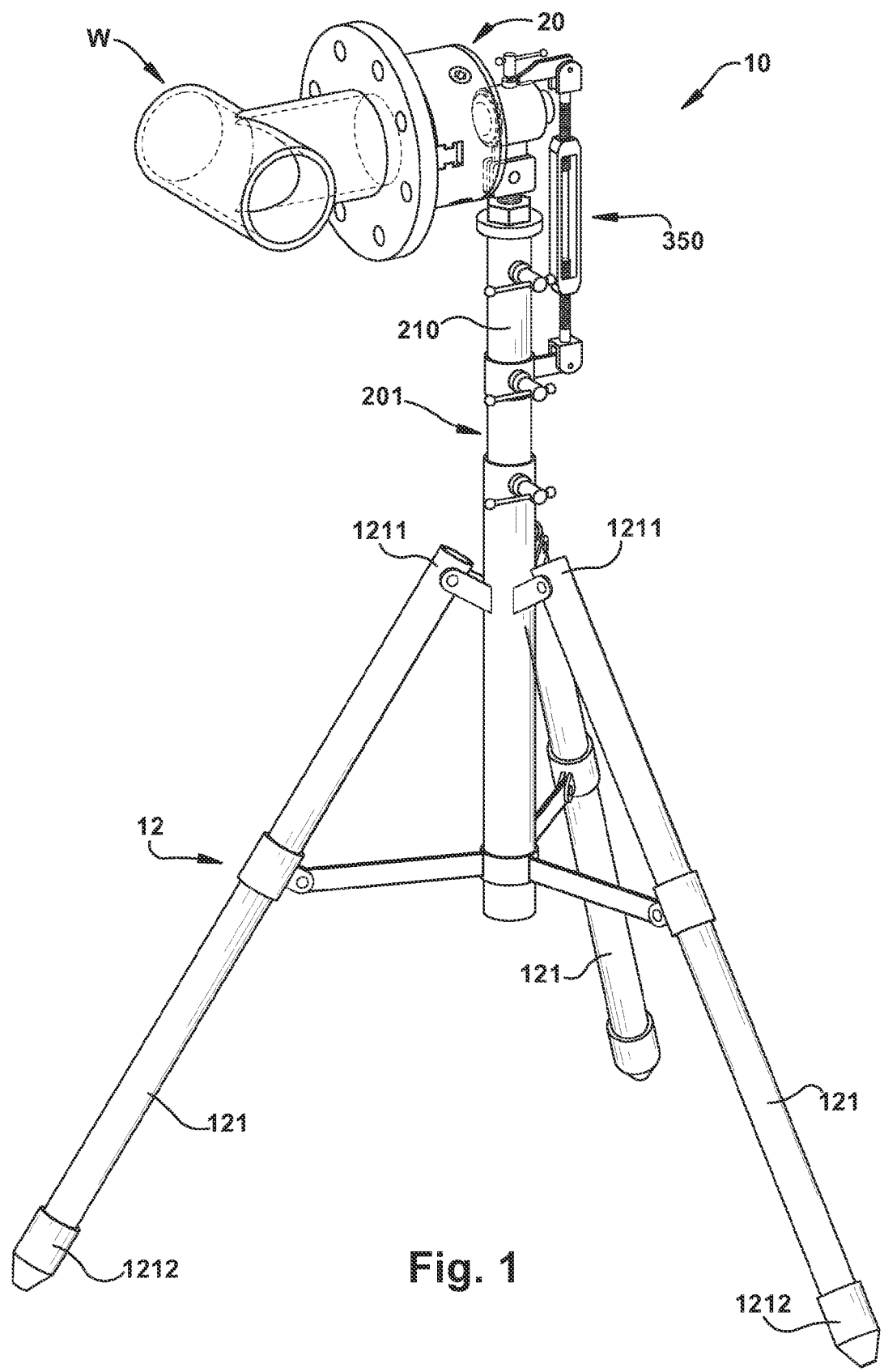
FIG. 1 is a perspective view of a representative embodiment of a welding fixture apparatus of the present disclosure.

As illustrated in FIG. 1, a welding fixture apparatus, indicated generally at 10, has a base indicated generally at 12, and a head, indicated generally at 20. In this particular embodiment, the base 12 is in the form of a tripod with legs 121 for supporting and positioning the head 20 in an elevated position and on any surface such as a level floor or uneven terrain for use of the apparatus out of doors, as further described. The legs 121 of the tripod are attached at upper ends 1211 to a support member 201 which in this configuration is generally vertically oriented, but may be in other orientations or configured to be adjustable to other orientations while extending generally upward from the leg ends 1211. The lower ends 1212 of the legs 121 may include covers or grips or pads as illustrated for stable contact with a floor or support surface, or include spikes or other gripping configurations for contact with the ground or other ground layers such as ice or frozen terrain.

Figure 2:
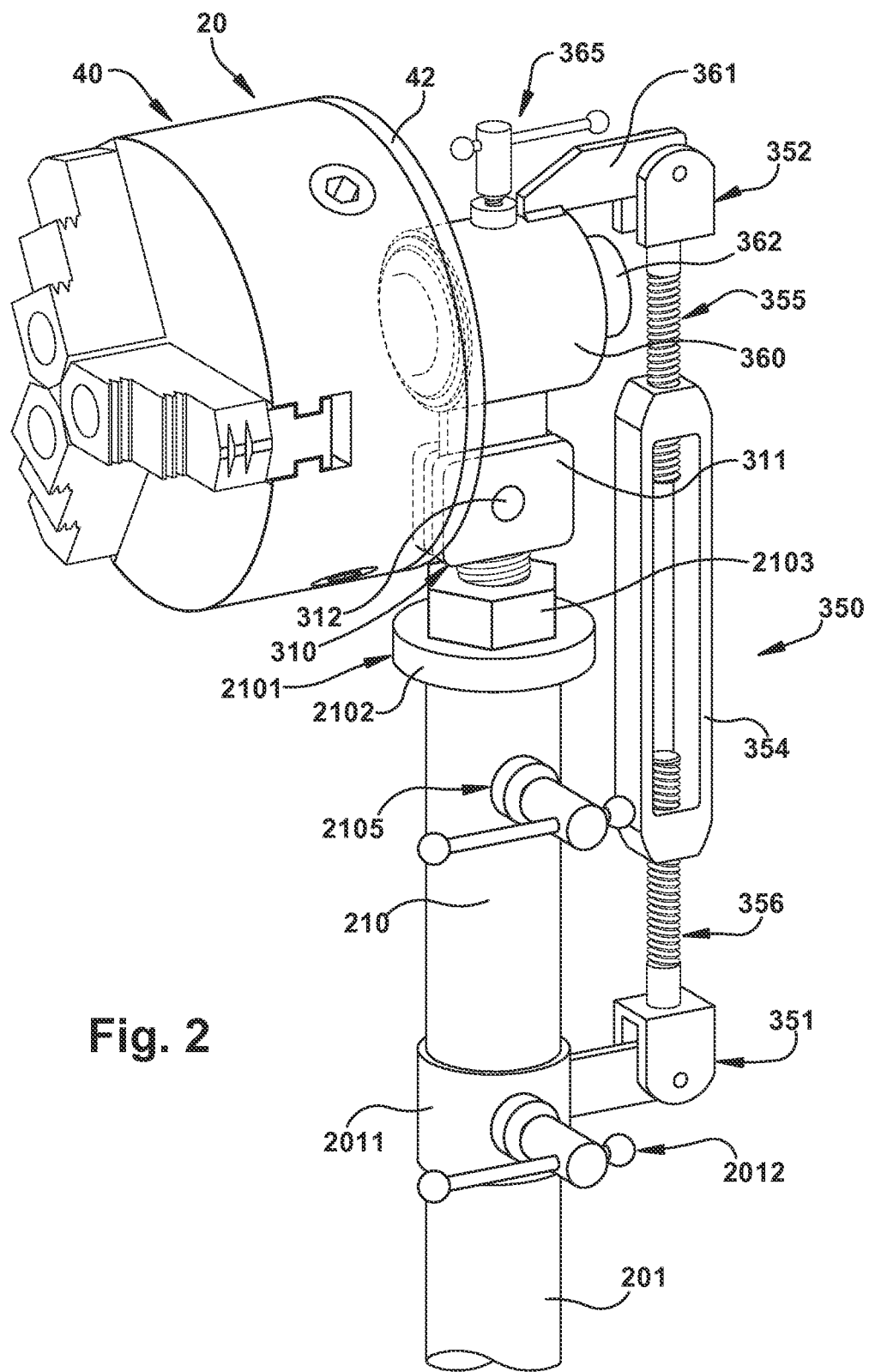
FIG. 2 is a perspective view of an upper portion of the welding fixture apparatus illustrated in FIG. 1.
Figure 3:
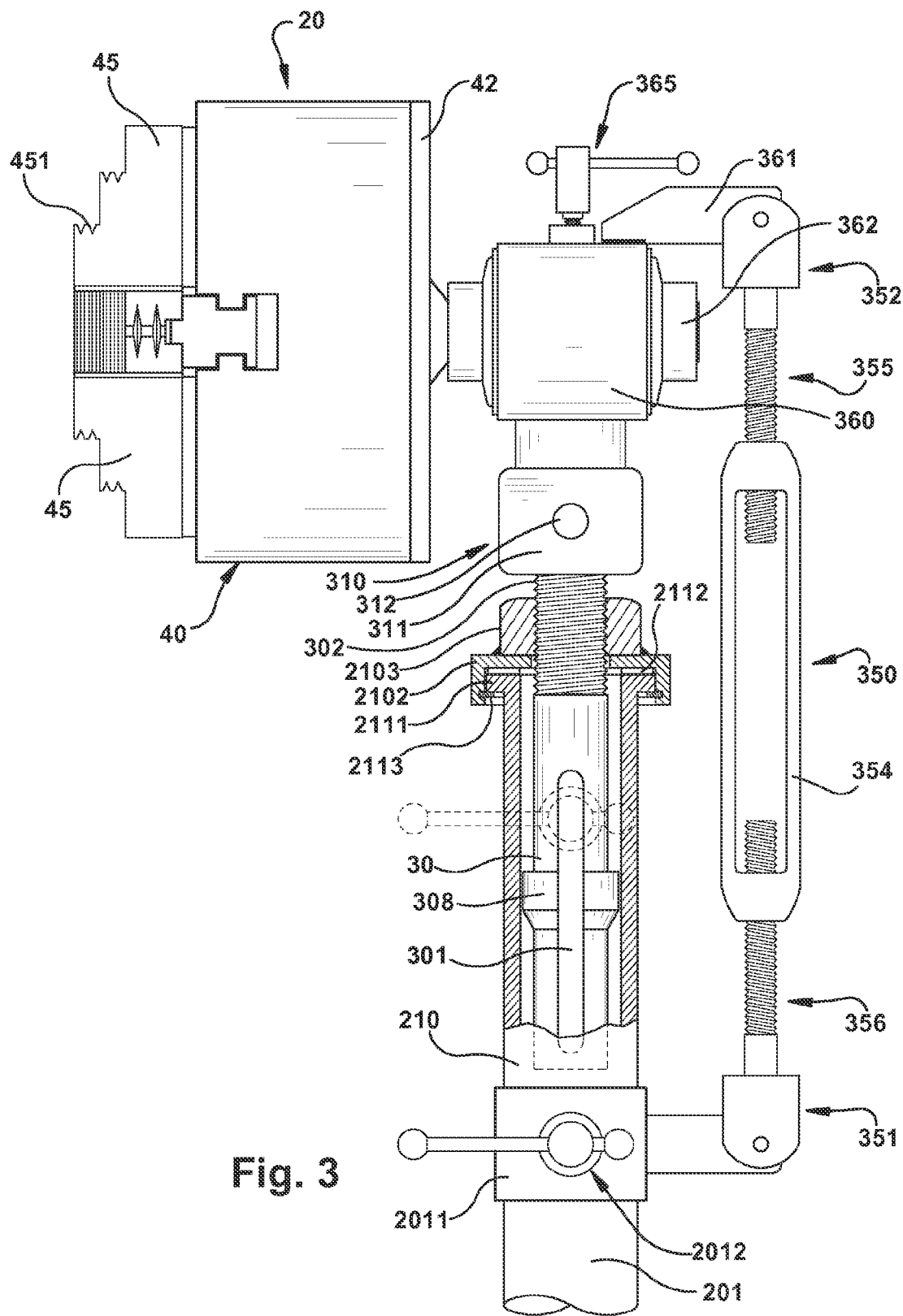
FIG. 3 is a profile view of the upper portion of the welding fixture apparatus illustrated in FIG. 1.
Figure 4:
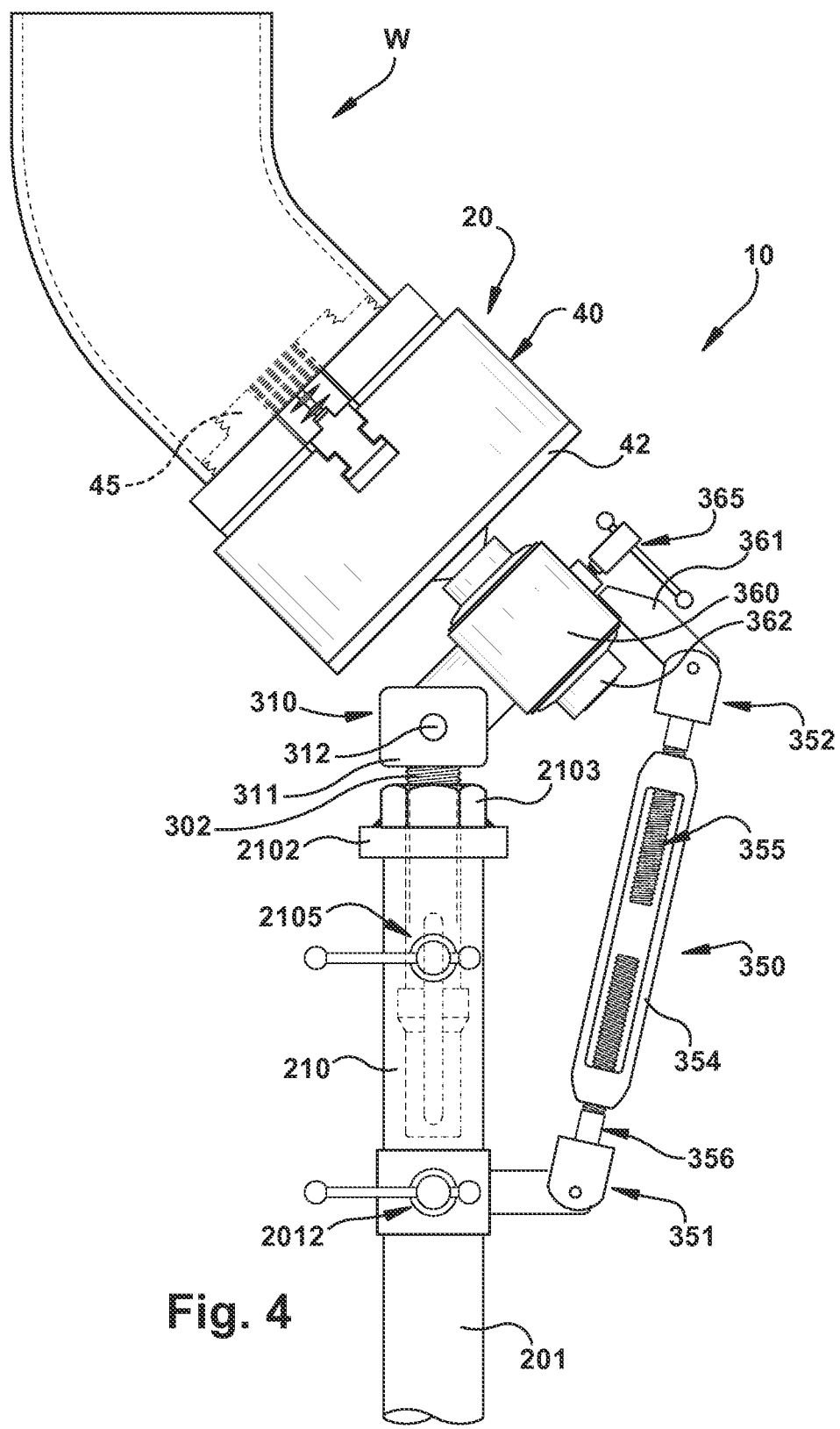
FIG. 4 is a profile view of the upper portion of the welding fixture apparatus illustrated in FIG. 1 in a different configuration.

As further illustrated in FIGS. 2-4, the support member 201 in this embodiment is in the form of a cylindrical tube and is configured to receive a head shaft column 210, for example by telescopic engagement of the head shaft column 210 into the upper end of the support member 201, which is fitted with a collar 2011 and a lock 2012, which may be in the form of a screw lock as illustrated to secure the position of the head shaft column 210 relative to the support member 201. Alternatively, the head shaft column 210 may be fixedly attached to the support member 201 or they may be formed together as a single unit or structure. The head shaft column 210 may be of any length which can be accommodated by the support member 201 and base 12.

With continued reference to FIGS. 2-5 and particularly FIG. 3, the head shaft column 210 has at an uppermost distal end a flange 2111 over which a collar 2102 and attached or integral threaded member such as a fine adjustment nut 2103 are fitted and with aligned through-bores for a head mount shaft 30 which extends therethrough. The head mount shaft 30 may be for example a threaded shaft with external threads 302 for engagement with internal threads in the fine adjustment nut 2103. A needle bearing ring 2112 is located on a top surface of flange 2111 against which an internal surface of the collar 2102 bears when the fine adjustment nut 2103 is turned. The collar 2102 is retained on the flange 2111 and against the bearing ring 2112 by ring 2113 which may be for example a snap retainer ring or the like.

The head shaft column 210 is also fitted with a lock 2105 such as a screw lock which extends through the wall of the head shaft column 210 and into an axial slot 301 formed in the head mount shaft 30 to fix the position of the head mount shaft 30 axially and radially with respect to the head shaft column 210. The exact elevation of the head 20 can be finely adjusted and set by turning of the adjustment nut 2103 to raise or lower the head mount shaft 30 relative to the head shaft column 210. The threads of the adjustment nut 2103 and head mount shaft are preferably relatively fine threads, such as for example one inch National fine thread or the like for very fine adjustment of the elevation of the head mount shaft and head and attached workpiece. The lock 2105 is then tightened to fix the position of the head mount shaft 30. A boss 308 is formed on the head mount shaft 30 which has an outer diameter dimension which meets and bears against the inner diameter surface of the wall of the head shaft column 210, as shown in FIG. 3. The boss 308 eliminates lateral movement and vibration of the head mount shaft 30 within the head shaft column 210. The slot 301 extends through the boss 308.

Attached to an upper distal end of the head mount shaft 30 is a pivot 310 which in this particular configuration includes first and second spaced apart plates 311 and a pivot pin 312. By this arrangement the angular orientation of the head 20 can be changed, for example as shown by the different orientations depicted in FIGS. 4 and 5, by pivoting the head about the pivot pin 312. A head pivot adjustment, indicated generally at 350, extends from collar 2011 (or otherwise from support 201) to the head 20 and more specifically to a head mount 360 which is attached to or otherwise extends from the pivot 310. The head pivot adjustment 350 is attached by stirrup pivot 351 to collar 2011, and by stirrup pivot 352 to head mount 360, for example by bracket 361, which may be welded to or otherwise connected to the head mount 360. The head mount 360 is in this particular embodiment in the general form of a cylindrical bearing mount in which a head rotational shaft or "head shaft" 362 is mounted for rotation of the head 20, for example in journal bearings or other bearings as further described. The operational length of the head pivot adjustment 350 can be changed by rotation of the double-ended screw 354 that is threaded with an upper shaft 355 which extends to stirrup pivot 352 and lower shaft 356 which extends to stirrup pivot 351, to pivot the head 20 up or down about the pivot pin 312, thus changing the angular orientation of a workpiece engaged with the head 20.

Figure 5:
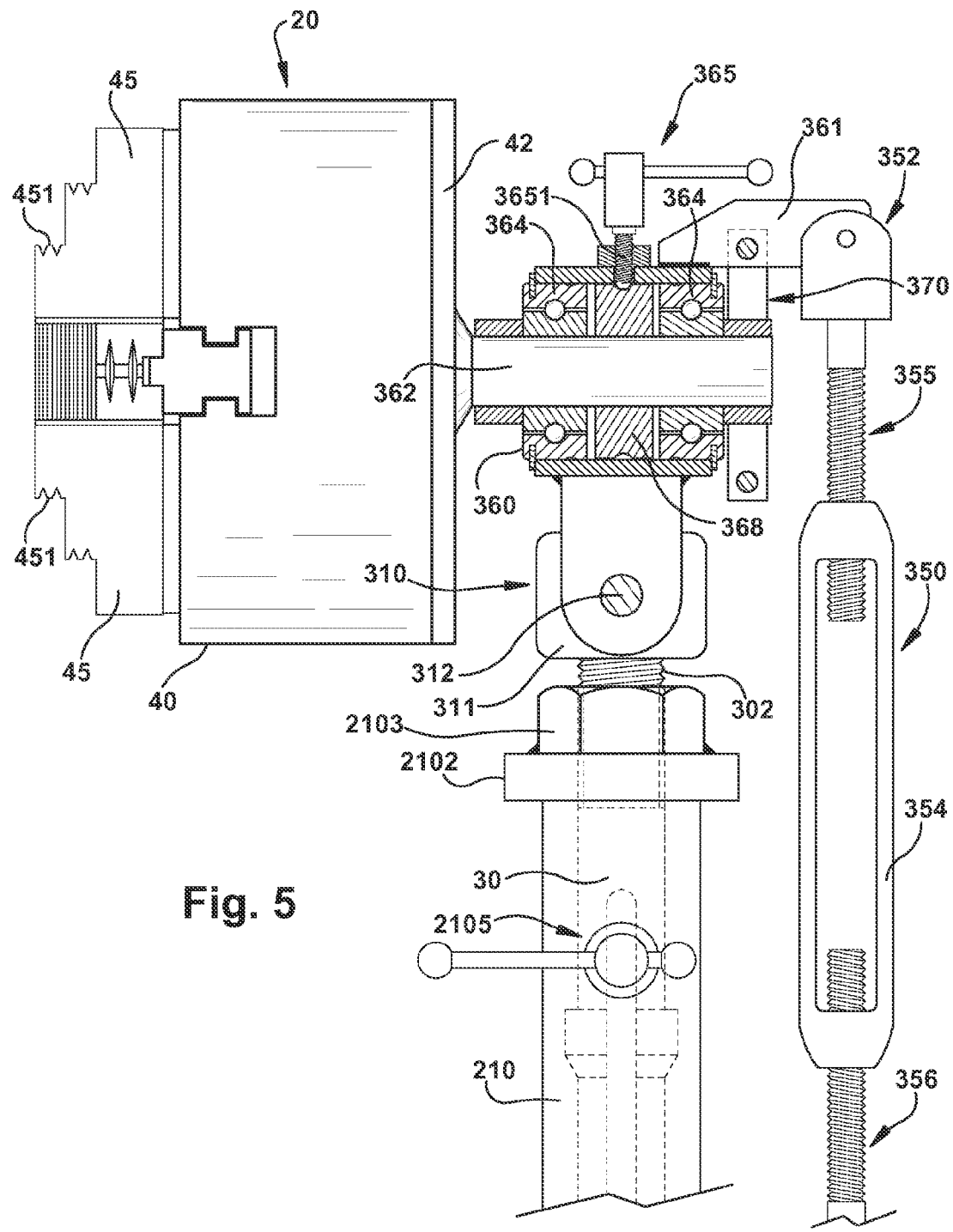
FIG. 5 is a partial cross-sectional view of the upper portion of the welding fixture apparatus illustrated in FIG. 1.
Figure 6:
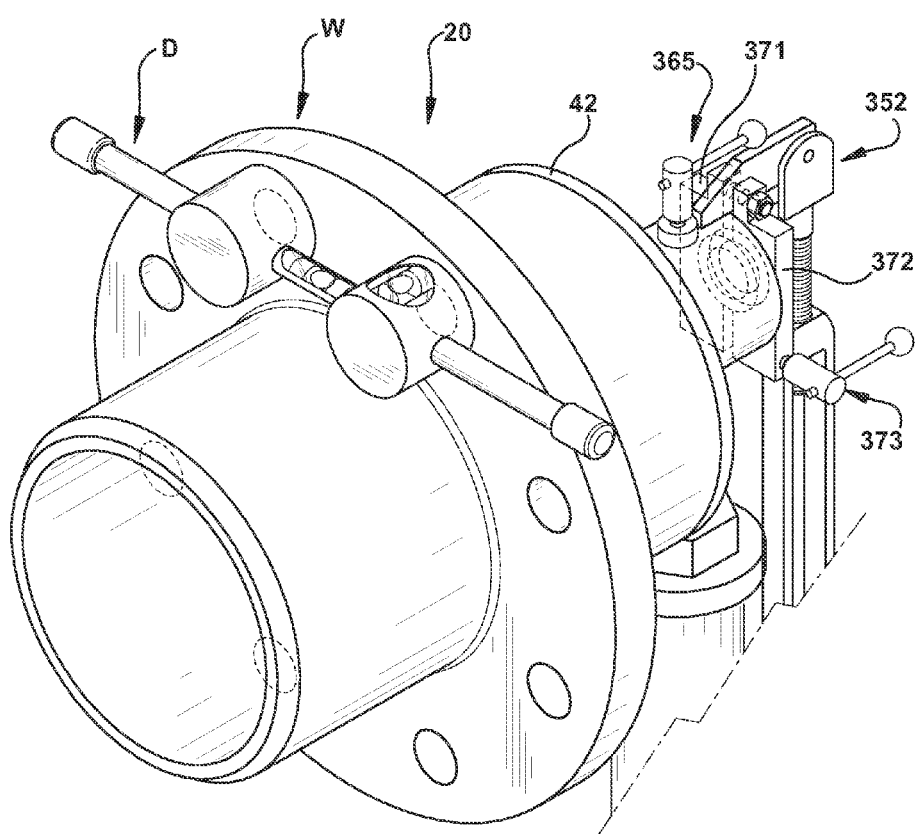
FIG. 6 is a perspective view of a head portion of a welding fixture apparatus with a pipe flange workpiece attached thereto.

The head 20 is in this particular embodiment in the form of a chuck, such as for example a lathe chuck with a generally cylindrical body 40 in which are mounted radially adjustable jaws 45 with contact surfaces 451. Although illustrated in this form, the disclosure and related inventions are not limited to any particular head configuration. Any head configuration which is suitable for or adapted to attach to and hold any type of workpiece, component or member for a welding or any other operation is within the scope of this disclosure. A head mounting plate 42 is attached to one end of the cylindrical body 40 of the head 20, and the head rotational shaft 362 is attached to the head mounting plate 42. The head 20 can be rotated to any radial angle by rotation of the head rotational shaft 362 within the head mount 360, for example within bearings 364 within the head mount 360, and fixed in any radial position by a head shaft rotation lock 365 in the head mount 360, such as a screw clamp type lock or any other suitable clamp or friction lock which restricts rotation of the head rotational shaft 362 and thereby fixes the radial position of the head 20, and thereby the radial orientation of a workpiece attached to the head. In a preferred embodiment as illustrated in FIG. 5, the lock 365 is in the form of a screw 3651 which extends through head mount 360 and contacts to bear against a compression ring 368 which encircles the head rotational shaft 362. An additional head shaft rotation lock, indicated at 370 in FIG. 5, can be provided proximate to or in connection with the head mount 360, for example in a split collar configuration with halves 371, 372 as shown in FIG. 6 with a threaded compression screw 373 to adjust the grip of the lock 370 upon shaft 362. In use the head shaft rotation lock 365 can be used as a primary or initial shaft positioning and/or locking device and may be adequate for shaft securement for many different types of operations. The head shaft rotation lock 370 can be used in combination with lock 365 for additional locking strength if necessary, or as the primary or sole shaft positioning and/or locking device.

Figure 7:
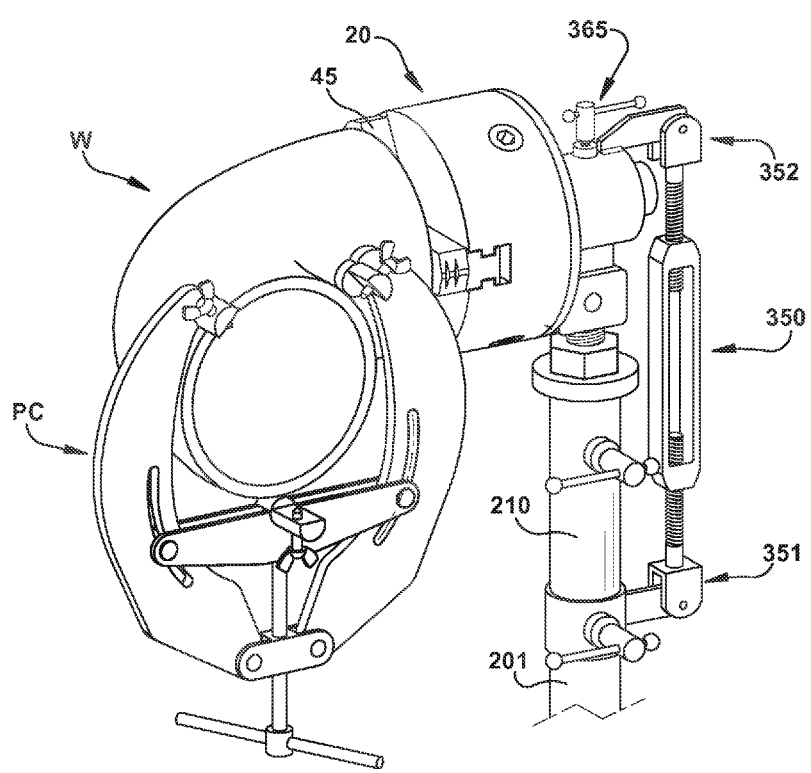
FIG. 7 is a perspective view of the head portion of a welding fixture apparatus with a pipe workpiece attached thereto and a pipe clamp attached to the workpiece.
Figure 8:
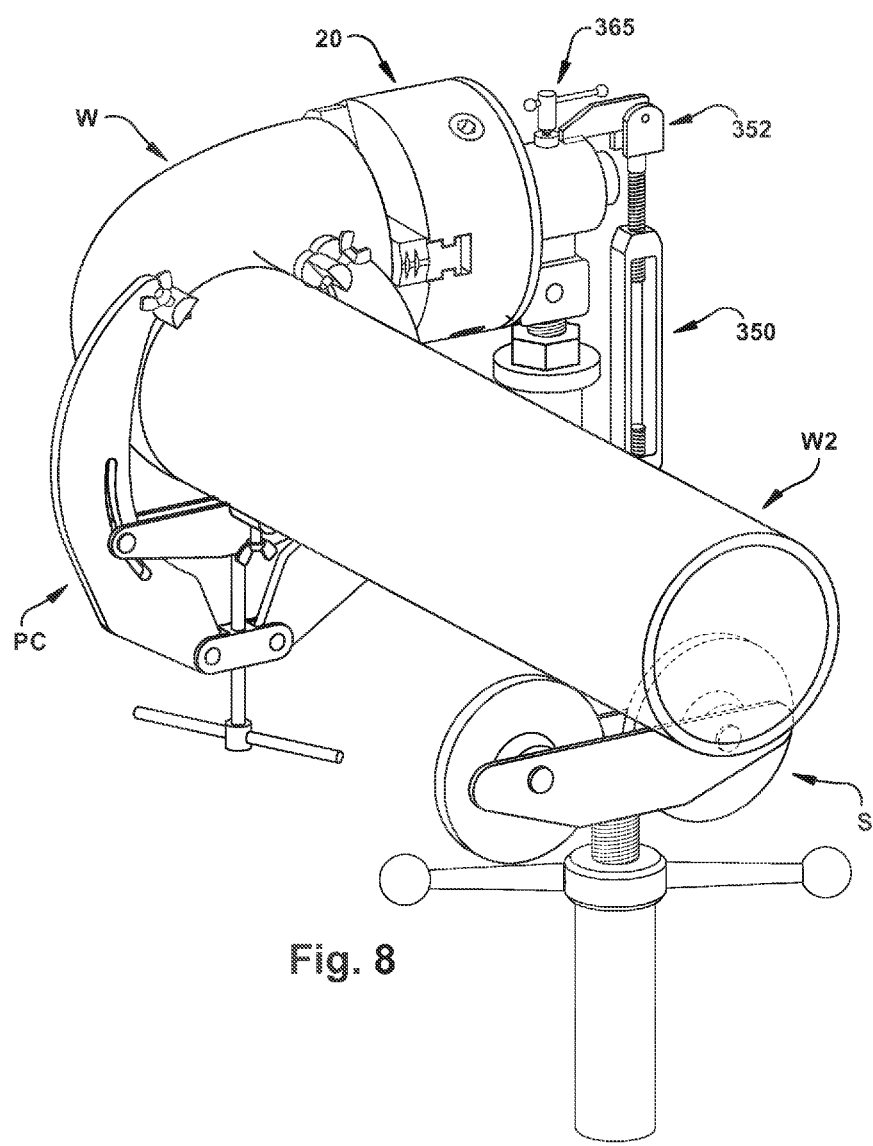
FIG. 8 is a perspective view of the head portion of a welding fixture apparatus with a pipe workpiece attached thereto and a pipe clamp attached to the workpiece and a workpiece support in supporting contact with the workpiece.

In the general configuration of the head 20 as a lathe chuck, the lathe chuck body 40 is attached to the head mounting plate 42. A radial array of interior slides or jaws 45, with teeth or contact surfaces 451, are mounted to radially translate within the cylindrical body 40 to engage the inner or outer diameter of a workpiece, indicated as W, such as a pipe as shown in FIG. 4 or flange as shown in FIGS. 1 and 6, positioned over the jaws 45 and proximate to the cylindrical body 40. Adjustment of the slides or jaws 45 for engagement with a workpiece W is by conventional operation of the lathe chuck as known in the art. As known the orientation of the jaws 45 within the chuck body may be reversed for engagement with the outer diameter or surface of a workpiece or pipe. Accordingly the apparatus 10 with a lathe chuck such as a six-inch lathe chuck can be used with in connection with pipe diameters from ¼" O.D. to 8" O.D. The apparatus 10 may also be used with larger size chucks or other gripping devices with the other described components sized accordingly. For example, FIG. 1 illustrates the head 20 engaged with a workpiece W in the form of a 4 inch schedule 40 butt weld T fitting welded to a 4 inch 8-bolt flange, with the head engaged directly with the flange. FIG. 4 illustrates a workpiece W as a 2 inch by 6 inch schedule 40 pipe engaged with the head 20. Also the gripping area and number of teeth of the contact surfaces 451 of the jaws 45 may be increased or otherwise modified to increase holding strength regardless of the orientation of the head 20. As shown in FIG. 6, a leveling or position instrument device D may be attached to the workpiece W in order to measure and indicate the precise orientation of the workpiece W as held by the head 20. Precise location and orientation of the workpiece W is achieved by operation of any of the described adjustment mechanisms and indicated by the device D prior to any welding application. The welding fixture apparatus thus provides a new and highly accurate apparatus and related methods of use for infinite precision positioning and holding workpieces for welding fabrication. As shown in FIG. 7, additional devices or components may be attached to a workpiece, such as to a pipe as illustrated, such as for example a pipe clamp PC which may be attached to a distal end of a pipe workpiece attached to the head 20. As shown in FIG. 8, an additional workpiece W2 may be connected to the workpiece W supported by head 20 by operation of the pipe clamp PC. The gripping force of the jaws 45 on the workpiece W and the force of the described locks is sufficiently strong to support and fixedly secure both the workpiece W and additional workpieces or devices for accurate welding operations. If necessary or desired, an additional device such as a stand or support S may be used to support either workpiece W or workpiece W2, for example at a location spaced from the head 20.

Any of the described components of the welding fixture apparatus can be sized and dimensioned for use of the apparatus in connection with any size workpieces, for example 8 inch, 10 or 12 inch pipe or other types of workpieces.

What is claimed is:

1. A welding fixture apparatus, comprising:
    a base having a plurality of legs arranged in a generally upright orientation and extending from a lower end to an upper end;
    a support member attached to upper ends of the legs and extending generally vertically upward from the upper ends of the legs, the support member having an opening in an upper end;
    a head configured for engaging a workpiece, the head attached to a head plate, and a head shaft attached to and extending axially from the head plate and away from the head;
    a head mount configured to axially receive and rotatably hold the head shaft, the head mount attached to an upper end of a head mount shaft, a lower end of the head mount shaft received in the support member through the opening in the upper end of the support member, the position of the head mount shaft being axially adjustable and fixable relative to the support member, and a pivot located between the head shaft and the support member and connected to the head mount shaft;
    a pivot adjustment that comprises a double ended screw, an upper threaded shaft engaged with a first end of the double ended screw and a lower threaded shaft engaged with a second end of the double ended screw; wherein the upper threaded shaft is coupled with the head mount shaft and the lower threaded shaft is coupled with the support member.

2. The welding fixture apparatus of claim 1 wherein the base comprise three legs in a tripod configuration.

3. The welding fixture apparatus of claim 1 further comprising a locking mechanism in connection with the support member, the locking mechanism operative to lock the head mount shaft in an axially aligned position relative to the support member.

4. The welding fixture apparatus of claim 1 further comprising a head shaft column having a first end received in the support member and a second end extending from the support member, and the head mount shaft received in the second end of the head shaft column.

5. The welding fixture apparatus of claim 4 further comprising a locking mechanism in connection with the head shaft column and operative to lock the head mount shaft in position relative to the head shaft column.

6. The welding fixture apparatus of claim 1 wherein the pivot is located at a distal end of the head shaft.

7. The welding fixture apparatus of claim 1 further comprising a locking mechanism in connection with the head mount operative to lock the head shaft relative to the head mount.

8. The welding fixture apparatus of claim 1 wherein the pivot adjustment comprises a first pivot located proximate to the support member and a second pivot located proximate to the head mount.

9. The welding fixture apparatus of claim 1 wherein the head mount shaft further comprises an axially aligned slot.

10. The welding fixture apparatus of claim 1 wherein the head mount shaft further comprises a boss which bears against an interior surface of the head shaft column.

11. The welding fixture apparatus of claim 1 further comprising a fine adjustment thread-engaged with the head mount shaft.

12. The welding fixture apparatus of claim 4 further comprising a flange at the second end of the head shaft column and collar on the flange.

13. The welding fixture apparatus of claim 12 further comprising a needle bearing ring located between the flange and the collar on the flange.

14. The welding fixture apparatus of claim 12 further comprising a retaining ring between the collar and the flange.

15. A welding fixture apparatus comprising:
    a base;
    a head configured for attachment to a workpiece, the head having a plurality of adjustable jaws mounted in a head body, the head body attached to a head shaft mounted for rotation in a head mount;
    a rotational shaft coupled with the head;
    the head mount attached to a pivot supported by a shaft which is supported by the base,
    a pivot adjustment that comprises a doubled ended screw engaged with a threaded shaft to change a position of the head about the pivot; and
    a head shaft rotation lock that comprises a screw which extends through the head mount and contacts to bear against a compression ring which encircles the head rotational shaft.

16. The welding fixture apparatus of claim 15 further comprising a head shaft column attached to the base, and a pivot adjustment which extends from the head mount to the head shaft column.

17. The welding fixture apparatus of claim 15 wherein the pivot is supported by a head mount shaft which is supported by the base.

18. The welding fixture apparatus of claim 17 wherein the head mount shaft is connected to a head shaft column which is supported by the base.

19. The welding fixture apparatus of claim 18 wherein the head mount shaft is connected to the head shaft column by an adjustable threaded connection.

20. The welding fixture apparatus of claim 18 wherein the pivot adjustment extends from the head mount to the head shaft column.

21. The welding fixture apparatus of claim 17 further comprising a lock operative to fix a position of the head mount shaft.

22. The welding fixture apparatus of claim 15 further comprising a second head shaft rotation lock, the second shaft rotation lock having a split collar configuration that comprises halves that engage the rotational shaft with a threaded compression screw to adjust the grip of the halves upon rotational shaft.

\* \* \* \* \*